UNITED STATES PATENT OFFICE.

WALTER GLAESER, OF BROOKLYN, NEW YORK, ASSIGNOR TO GEORGE T. BISHOP, OF MACEDONIA, OHIO.

PROCESS FOR RENDERING AVAILABLE THE POTASH OF FELDSPAR AND SIMILAR MATERIALS.

1,237,197.     Specification of Letters Patent.     Patented Aug. 14, 1917.

No Drawing.     Application filed September 16, 1914. Serial No. 862,057.

*To all whom it may concern:*

Be it known that I, WALTER GLAESER, a subject of the German Emperor, and a resident of the city of New York, borough of Brooklyn, in the county of Kings and State of New York, have invented a new and Improved Process for Rendering Available the Potash of Feldspar and Similar Materials, of which the following is a full, clear, and exact description.

The object of the invention is to provide a new and improved process of rendering the potash contained in feldspar, feldspathic rock and like material useful for agricultural purposes at a comparatively small cost.

In order to accomplish the desired result, the feldspar, feldspathic rock or like material, preferably in lump form, is first burned at a low red heat (about 800° centigrade) in a suitable furnace for say about two hours, and then the heated material is cooled off suddenly, preferably by the use of water, to chill the material. The material is next mechanically reduced by a suitable crusher to about 40 to 60 mesh and is then mixed in a suitable mixing apparatus with burnt lime, preferably in the proportion of 100 parts of the material to, at least, 16 parts of burnt lime, and then the mixture is fused in a suitable furnace at a temperature in excess of 1600° centigrade and in the presence of air.

By the process described a basic silicate is formed which is insoluble in water but readily soluble in even very dilute acids. The fused mass is powdered to, at least, 60 mesh and may then be directly applied to the soil without any further treatment owing to the fact that the product contains the potash in an available state. However, the fused powdered mass is preferably further treated with sulfuric acid in a suitable vessel of earthenware or the like, the sulfuric acid being preferably in a hot state. In practice I have found that the addition of about 30 parts of sulfuric acid and 100 parts of the fused product produces a satisfactory result. The resultant mass containing silica, calcium sulfate and potash alum, is allowed to dry out and is then used directly on the soil as potash fertilizer, and as potash alum is easily soluble in water it is evident that the moisture of the air and soil dissolves the potash alum and the latter is taken up by the soil. If desired, the potash alum in the resultant mass above described may be extracted by the use of water and then used on the soil. The process described can be carried out at a comparatively low expense to render the product sufficiently cheap to compete with soluble potash salts now in the market.

It is understood that by first heating the material and then suddenly cooling it, the material is disintegrated by the heat and held in this disintegrated condition by the sudden cooling, so that the material can be readily reduced and a thorough mixture formed with the lime to allow proper subsequent fusing.

Having thus described my invention, I claim as new and desire to secure by Letters Patent:

1. The process of rendering the potash contained in feldspathic rock and like material useful for agricultural purposes, which consists in burning the material at a low red heat, then suddenly cooling the heated material, mixing burnt lime with the material in the proportions of less than 20% and then fusing the mixture at 1600° centigrade.

2. The process of rendering the potash contained in feldspathic rock and like material useful for agricultural purposes, which consists in burning the material at a low red heat, then suddenly cooling the heated material, mixing burnt lime with the material in the proportions of less than 20%, fusing the mixture at 1600° centigrade and then subjecting the ground product to the action of sulfuric acid to form potash alum.

In testimony whereof I have signed my name to this specification in the presence of two subscribing witnesses.

WALTER GLAESER.

Witnesses:
   THEO. HUMAR, Jr.,
   BESSIE E. COHN.

Copies of this patent may be obtained for five cents each, by addressing the "Commissioner of Patents, Washington, D. C."